UNITED STATES PATENT OFFICE.

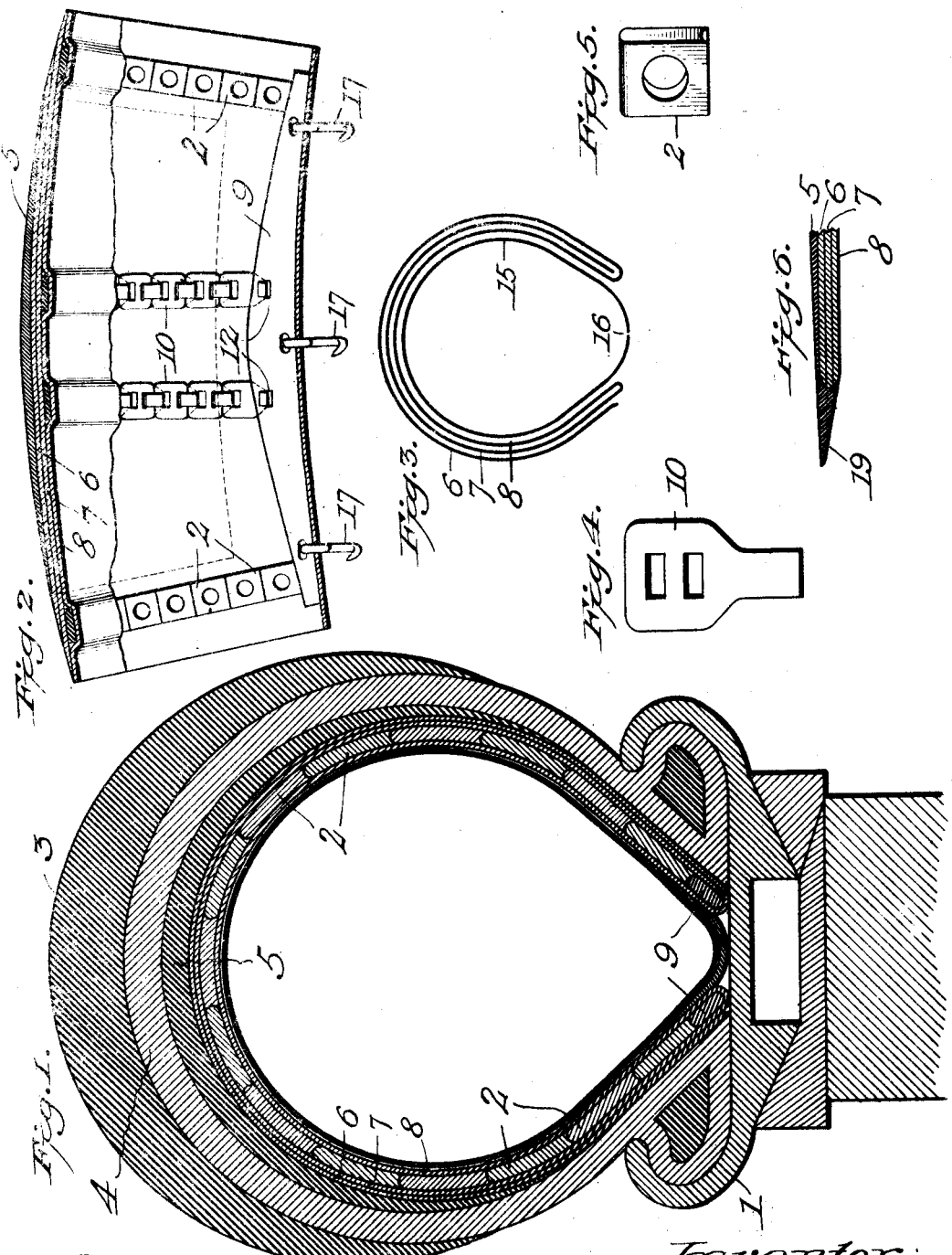

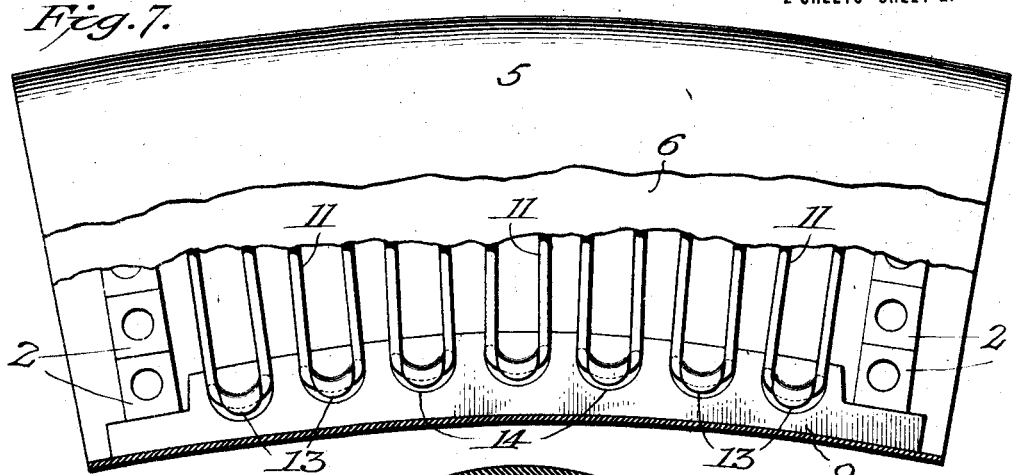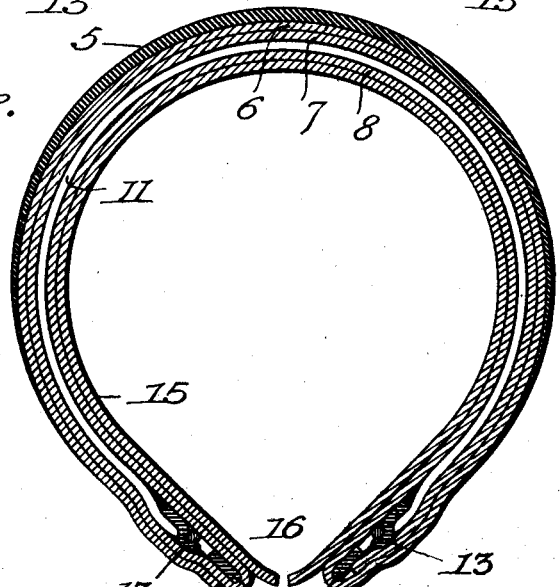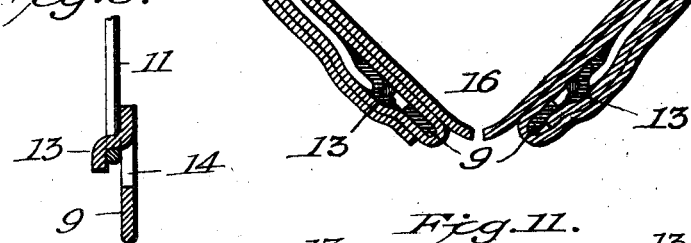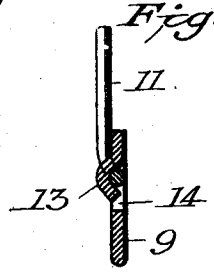

JASPER N. DAVIS, OF DENVER, COLORADO.

BLOW-OUT PATCH FOR PNEUMATIC TIRES.

1,194,279.  Specification of Letters Patent.  Patented Aug. 8, 1916.

Application filed August 16, 1915. Serial No. 45,816.

*To all whom it may concern:*

Be it known that I, JASPER N. DAVIS, a citizen of the United States of America, residing in the city and county of Denver and State of Colorado, have invented a new and useful Blow-Out Patch for Pneumatic Tires, of which the following is a specification.

This invention relates to blow out patches for pneumatic tires.

The object of my invention is to provide a self-adjusting patch which is held in position within the outer tube without the employment of any anchoring means for engaging the said tube, means being provided for preventing bulging of the patch through the blow out and for causing its ends to forcibly engage the outer tube under internal pressure whereby shifting of the patch is prevented. Further, to provide a rubber protected blow out patch of this character which will resist the usual wear to which such patches are subjected and in which the life and efficiency of the said blow out patch are maintained. These objects are accomplished by the form of patch illustrated in the accompanying drawings, in which:

Figure 1, is a transverse sectional view through an automobile tire and rim provided with my improved inside blow out patch. Fig. 2, is a vertical longitudinal sectional view through the blow out patch, the inner fold or lap of the same being broken away to show one form of bracing means therefor. Fig. 3, is a diagrammatic view showing the manner of folding the material of which the patch is formed. Fig. 4, is a front view of a link of one of the chains which is attached to the truss bars as shown in Fig. 2, to prevent bulging of the patch under pressure from the inner tube. Fig. 5, is a perspective view of one of the sections which make up the jointed arches at each end of the patch. Fig. 6, is a fragmental sectional view, and illustrates a tapered soft rubber extension which is preferably secured upon each end of the patch. Fig. 7, is a side elevation of a blow out patch, partly broken away, and illustrating a modification in which the chains are dispensed with, a plurality of wires or cables or a continuous wire or cable being employed for preventing bulging of the patch due to internal pressure. Fig. 8, is a transverse sectional view of Fig. 7. Fig. 9, is a vertical sectional view of one of the truss bars showing the wire holding tongue bent out to receive the looped end of the wire or cable. Fig. 10, is a view similar to Fig. 9, showing the tongue pressed in as in Fig. 8. And Fig. 11, is a side view of a portion of one of the truss bars, showing the tongues before being bent out.

Similar letters and numerals refer to similar parts throughout the several views in the accompanying drawings.

Referring to the drawings,—the numeral 1, Fig. 1, indicates the tire rim of an automobile or other vehicle in which the bead of a tire is held, 3 is the rubber tread of the tire, 4 is the fabric or body portion of a tire, 5 is the rubber cover protecting my blow out patch, and 6, 7 and 8 are the folds or laps constituting the body portion of the same.

The numeral 2 refers to a series of interlocking blocks, forming an arch in the ends of the body portion of the patch. These blocks may be made of any suitable hard material, the blocks being so curved that each arch conforms to the interior curvature of the tire. The arches formed by these blocks serve as hold downs to truss bars 9 which rest in the longitudinal ends of the patch. These arches rest upon the end portions of the said truss bars, as shown in Fig. 2.

One of the disadvantages of the present construction of inside blow out patches in present use is, that the air pressure from the inner tube against the patch causes it to bulge to a certain extent at the weakened or blown out place in the casing under which the patch is placed. One of the objects in my present construction is to eliminate this disadvantage, and this is accomplished by means of any suitable form of chain or flexible wire, cables, or strong cords, chains 10 being shown in Fig. 2, and a wire or wires 11 in Fig. 7, which are fastened to truss bars 9 by means of eye holes 12, Fig. 2, or projecting hooks 13, Fig. 7. It can be readily seen and understood that there can be no bulging out of a blow out patch constructed in this manner.

The truss bars 9 are held down to the rim and in place in the bends of the fabric by means of the jointed flexible arches 2. The blocks comprising the arches are so constructed that they interlock into one another in such a way that the pressure of the inner tube forcing them outward practically forms a solid arch whereby the truss bars 9 are held down as stated, and thus prevent the blow out patch from any bulging as there is no stretching of the flexible chains or cables 10 or 11 as the case may be. The cables or cords 11 shown in Fig. 7 may be either one continuous lace or independent endless loops each one being separate from the other. I prefer the latter construction because if one of the loops is broken by a bruise the other will remain intact. The projecting hooks 13 are preferably cut and pressed out of the metal trusses 9 and are oval shaped, which prevents cutting of the cables or cords. Fig. 11 illustrates a portion of one of the truss bars 9, showing circular shaped apertures 14 in the bar, which release the tongues 13, which are afterward pressed outward to the shape shown in Figs. 7 and 9, giving them the form of the usual lace hooks on a man's shoe, and which prevents the cutting of the flexible cables or cords. When the cables are placed under the hooks as shown in Fig. 9, the hooks are pressed inward as seen in Fig. 10, which secures the cables in place, and also reduces the combined width of the cable and bar as can be seen by comparing the two Figs. 9 and 10.

In Fig. 8 is shown a section through the blow out patch and through the bars 9 and the hooks 13, giving the relative positions of the said bars 9, and the cables 11 in the flexible member of the patch, which may be of material such as wire gauze, wire stranded cables or fabric cloth. In the larger sized patches where more strength is required, extra layers of fabric or other material of which the patch is made, may be put either on the outside or inside or both as desired. In Fig. 8 an extra layer 15 is shown on the inside, the longitudinal edges of which may be extended to come together as seen at 16 or one may overlap the other. The side braces 9, Fig. 8, are shown resting in the short bend of the laps 6 and 8, and one side of the endless cable, or one lap of a continuous lace of a cable or one length of a chain form 10, as seen in Fig. 2, is seen hooked into truss bar 9, Fig. 8, and coming in between the layers of flexible fabric material 6 and 8, also between the same layers 6 and 8 are the arch bracing blocks 2, Fig. 1. The layers of material 6, 7 and 8 are folded of one continuous piece as shown in Fig. 3; however the said layers could be each a separate piece and the truss bar 9 riveted or otherwise secured to them, but as this would be bulky and require extra expense in manufacturing. I prefer folding the three layers all from one piece as shown.

The folded fabric should be of a thickness commensurate with the size and strength of blow out patch required, with the additional layer 15, Fig. 8, if needed.

In the extra heavy and stronger blow out patches for extra heavy pleasure or commercial vehicles, extra anchors such as hooks 17, Fig. 2, may be needed and these may be designed to anchor into the bead of the tire or under the inner point of the tire or outer casing bead.

In Fig. 5 is shown one of the blocks which make up the bracing arch previously described and these blocks may be made of any design desired. They may also be perforated in any form to reduce weight and still afford the required strength. These blocks 2 as seen in Fig. 1, have concave and convex bearing edges by which they are held in place by each other, this arrangement giving a permanent bearing end surface at all times when the tire is run soft or is pressed inward by stones or other objects run over by the tire.

In Figs. 1, 2 and 8 the tread of the blow out patch is protected with rubber vulcanized thereon which protects the patch from wear of the road bed and also from having a hole pinched through it by a separated or chafed inner fabric of the outer casing. I prefer extending the rubber tread to each end of the patch, terminating it beyond the ends of the patch into a very soft extension 19, Fig. 6, to protect the inner tube from pinching at the ends of the blow out patch.

The blow out patch herein described and claimed is self adjusting, self depending and rubber protected, and one which has greater self strength and longer wear than any other known to me on the market at the present time. It is not only a more efficient and superior inside blow out patch than those in present use, but it will not be necessary with this patch to use any style of "out side lace" or "hook on blow out patches." It may be called a detachable section because of its self contained strength and rubber protected tread.

Having described my invention, what I claim as new and desire to secure by Letters Patent, is:

1. In a blow out patch for pneumatic tires, a piece of suitable flexible material folded upon itself to form three laps of substantially equal length, truss bars which rest in the portions where the two bends occur, and flexible means which are secured to the truss bars and extend around between the laps of the patch to prevent bulging of the same under expansion.

2. In a blow out patch for pneumatic tires, a piece of suitable flexible material folded upon itself to form three laps of equal length, the middle lap terminating within the bend formed by the two other laps, the whole being given a U-shaped curve, truss bars which rest in the portions where the two bends occur, flexible means which are secured to the truss bars and extend around between the laps of the patch to prevent bulging of the same under expansive pressure, and means for holding said truss bars against the outward pulls exerted by the said flexible means.

3. In a blow out patch for pneumatic tires, a piece of suitable flexible material folded upon itself to form three laps of substantially equal length, truss bars which rest in the portions where the two bends occur, means for holding the said truss bars against outward pull when the patch is under expansion pressure and hooks for preventing creeping of the patch within the tire.

4. The combination with a pneumatic tire comprising inner and outer tubes, of a patch interposed between the said tubes, the longitudinal edges of which terminate at the terminal edges of the said outer tube, truss bars in the longitudinal edges of said patch, and means extending around the end portions of said patch and engaging the end portions of the said truss bars, to hold them against outward pull due to expansion pressure.

5. The combination with a pneumatic tire comprising inner and outer tubes, of a patch interposed between the said tubes, the longitudinal edges of which extend parallel with the terminal edges of the said outer tube, truss bars in the longitudinal edges of the said patch, means connected with the said truss bars and extending around the patch to prevent bulging of the same under expansion pressure, and means extending around the ends of the patch and engaging the ends of the truss bars, for holding them against outward pull exerted by the means for preventing bulgings.

6. The combination with a pneumatic tire, comprising inner and outer tubes, of a patch of suitable flexible material interposed between the said tubes, the longitudinal edges of which terminate at the terminal edges of the outer tube, the tread portion of said patch having a rubber coating, truss bars in the longitudinal edges of the said patch, flexible connections extending around through the patch and attached to the said truss bars, and jointed arch members extending around through the ends of the patch and resting on said truss bars.

7. The combination with a pneumatic tire comprising inner and outer tubes, of a patch interposed between said tubes consisting of a piece of suitable flexible material folded upon itself to form three laps, a coating of rubber vulcanized upon the tread portion of said patch, truss bars resting in the looped edges of said patch, flexible connections extending around between the laps of the patch and connected to the said truss bars, and jointed arch members extending around the ends of the patch between the laps thereof, their ends resting upon the ends of the said truss bars.

8. The combination with a pneumatic tire comprising inner and outer tubes of a U-shaped patch comprising a piece of suitable flexible material folded upon itself to form three laps of substantially equal length, the tread portion of said patch having a coating of rubber vulcanized thereon, curved truss bars which rest in the folded edges of said patch, flexible connections which extend around between the laps of the patch and are connected to said truss bars, sectional arch members which extend around the ends of the patch between the laps thereof, the terminal members of which rest upon the ends of said truss bars, and a reinforcing strip which extends around the interior of the patch.

9. A blow out patch for pneumatic tires having a rubber coating upon its tread portion, truss bars in its longitudinal edges, flexible anti-bulging means extending around through said patch and secured to said truss bars, and bracing means extending around through the ends of the patch, the terminal portions thereof resting upon the ends of the said truss bars.

10. In a blow out patch for pneumatic tires, a U-shaped sheet of flexible material, having truss bars along its terminal longitudinal edges, anti-bulging elements connected to said truss bars and extending around through said patch, and sectional bracing elements extending around through the ends of said patch the terminal portions thereof resting upon the ends of said bars.

11. A blow out patch for pneumatic tires comprising a sheet of suitable material folded upon itself to form three laps of substantially equal length, the whole being U-shaped in cross section, truss bars in the longitudinal edges of said patch having projections, anti-bulging elements extending around between the laps of said patch and connected to said projections, and sectional bracing arches extending around through the ends of said patch the terminal members of which rest upon the said truss bars.

12. A blow out patch for pneumatic tires comprising a sheet of suitable material folded upon itself to form three laps of equal length, the tread portion of which has a rubber coating, truss bars in the folded edges of said patch having hooks struck out from their surfaces, wire extending around between the laps of the patch and engaging said hooks, and bracing arches extending around the ends of the patch between the laps thereof comprising a plurality of metal sections the terminal members of which rest upon the ends of the said truss bars, the adjoining edges of said sections being in contact.

13. A blow out patch for pneumatic tires having curved truss bars in its longitudinal edges having hooks struck out from their surfaces, a wire which is passed around back and forth in said patch, the looped portions of which engage the said hooks, and bracing arches in the ends of said patch comprising a plurality of metal sections whose adjoining edges are respectively grooved and rounded to fit one within the other, the terminal sections resting upon the ends of the truss bars.

In testimony whereof I affix my signature in presence of two witnesses.

JASPER N. DAVIS.

Witnesses:
  MARY E. DAVIS,
  ADELLA M. FOWLE.